United States Patent
Minne et al.

(10) Patent No.: US 11,224,824 B2
(45) Date of Patent: Jan. 18, 2022

(54) BASE FOR A MASS-TRANSFER COLUMN

(71) Applicants: thyssenkrupp Industrial Solutions AG, Essen (DE); thyssenkrupp AG, Essen (DE)

(72) Inventors: Pascal Minne, Dortmund (DE); Horst Honecker, Lünen (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 115 days.

(21) Appl. No.: 16/496,555

(22) PCT Filed: Mar. 15, 2018

(86) PCT No.: PCT/EP2018/056571
§ 371 (c)(1),
(2) Date: Sep. 23, 2019

(87) PCT Pub. No.: WO2018/172187
PCT Pub. Date: Sep. 27, 2018

(65) Prior Publication Data
US 2021/0106926 A1    Apr. 15, 2021

(30) Foreign Application Priority Data
Mar. 22, 2017 (DE) .................... 10 2017 106 175.4

(51) Int. Cl.
| *B01D 3/16* | (2006.01) |
| *B01D 3/22* | (2006.01) |
| *B01D 3/32* | (2006.01) |
| *B01D 53/18* | (2006.01) |

(52) U.S. Cl.
CPC ............... *B01D 3/166* (2013.01); *B01D 3/22* (2013.01); *B01D 3/324* (2013.01); *B01D 53/185* (2013.01)

(58) Field of Classification Search
CPC .......... B01D 3/166; B01D 3/22; B01D 3/324; B01D 53/18; B01D 53/185
(Continued)

(56) References Cited

U.S. PATENT DOCUMENTS

| 990,159 A | * | 4/1911 | Olsen ...................... F02M 1/00 |
| | | | 261/155 |
| 3,445,343 A | * | 5/1969 | Popov ...................... B01D 3/18 |
| | | | 202/158 |

(Continued)

FOREIGN PATENT DOCUMENTS

| CH | 463465 A | 10/1968 |
| DE | 1249846 B | 9/1967 |

(Continued)

OTHER PUBLICATIONS

English Translation of International Search Report issued in PCT/EP2018/056571, dated Apr. 17, 2018.

*Primary Examiner* — Charles S Bushey
(74) *Attorney, Agent, or Firm* — thyssenkrupp North America, LLC

(57) ABSTRACT

A tray for a mass-transfer column may allow contact between liquid and gas phases. The tray may include a tray inlet via which the tray is supplied with a liquid phase, a tray outlet via which the liquid phase flows out from the tray, first guide mechanism for guiding the liquid phase where the first guide mechanism forms a first flow path along which the liquid phase flows from the tray inlet to the tray outlet, an inlet for a temperature-control fluid, an outlet for the temperature-control fluid, and second guide mechanism for guiding the temperature-control fluid for heat exchange with the liquid phase. The second guide mechanism forms a second flow path that overlaps with the first flow path and leads from the inlet to the outlet. The temperature-control (Continued)

fluid flows along the second flow path in a direction opposite the flow direction of the liquid phase.

13 Claims, 4 Drawing Sheets

(58) Field of Classification Search
USPC .......................... 261/114.1, 114.5, 152, 155
See application file for complete search history.

(56) References Cited

U.S. PATENT DOCUMENTS

| | | | | |
|---|---|---|---|---|
| 3,497,327 | A * | 2/1970 | Kehse | ................ B01J 19/006 |
| | | | | 422/111 |
| 6,631,892 | B1 * | 10/2003 | Erickson | ............ B01F 3/04496 |
| | | | | 261/114.1 |
| 9,427,678 | B2 | 8/2016 | Bechtel | |
| 9,457,335 | B2 * | 10/2016 | Pham | ................ B01J 19/248 |
| 2015/0190730 | A1 * | 7/2015 | Govindan | ................ B01F 3/04 |
| | | | | 261/149 |
| 2020/0094161 | A1 * | 3/2020 | Minne | ................ B01D 3/16 |

FOREIGN PATENT DOCUMENTS

| | | | |
|---|---|---|---|
| DE | 1520056 | A | 8/1969 |
| DE | 10000288 | C | 5/2001 |
| GB | 110910 | A | 8/1918 |
| GB | 575335 | A | 2/1946 |
| KR | 1019900700172 | A | 12/1990 |
| WO | 2013072353 | A | 5/2013 |

* cited by examiner

BASE FOR A MASS-TRANSFER COLUMN

CROSS REFERENCE TO RELATED APPLICATIONS

This application is a U.S. National Stage Entry of International Patent Application Serial Number PCT/EP2018/056571, filed Mar. 15, 2018, which claims priority to German Patent Application No. DE 10 2017 106 175.4, filed Mar. 22, 2017, the entire contents of both of which are incorporated herein by reference.

FIELD

The present disclosure generally relates to trays for mass-transfer columns.

BACKGROUND

Mass-transfer columns such as an absorption column, a rectification column, a stripping column or a distillation column have been seen to be found in chemical plant construction for decades.

For example, a separation of materials occurs in a mass-transfer column by intensive contact of a liquid phase with a gas phase. Here, the liquid phase can run from the top downward through the mass-transfer column and the gas phase can be conveyed in the opposite direction from the bottom upward through the mass-transfer column.

In order to ensure contact between the liquid phase and the gas phase, a plurality of superposed trays can be provided in the mass-transfer column, with the trays each being able to be configured so that the liquid runs over the tray.

Furthermore, mass-transfer elements such as gas passage openings through which the upward-flowing gas ascends through the liquid can be provided in such a tray.

The superposed trays can be connected to one another by means of inflow shafts or outflow shafts. Such shafts can conduct the liquid phase onto the next tray and, for example, serve as conduit for degassed liquid from one tray to the tray underneath. Such shafts are also known by the term downcomer.

In this context, the document WO 2013/072353 A1 discloses a tray for a mass-transfer column having gas passage openings which are distributed over the tray and also at least one guide plate for deflection of the flow of liquid flowing onto the tray, with the tray being able to be supplied with a liquid via at least one inlet and the tray having at least one inlet, at least one separation weir which divides the inflowing liquid into two streams and having at least two outlets or at least two inlets and at least one outlet for the liquid, with each stream flowing along a flow path to an outlet.

As further prior art, mention may be made of DE 15 20 056 A and CH 463 465 A.

Thus a need exists for a tray for a mass-transfer column, which compared to previously known trays offers improved properties in respect of manufacture and/or in respect of the thermodynamic behavior in mass-transfer.

DETAILED DESCRIPTION

Figure 1:
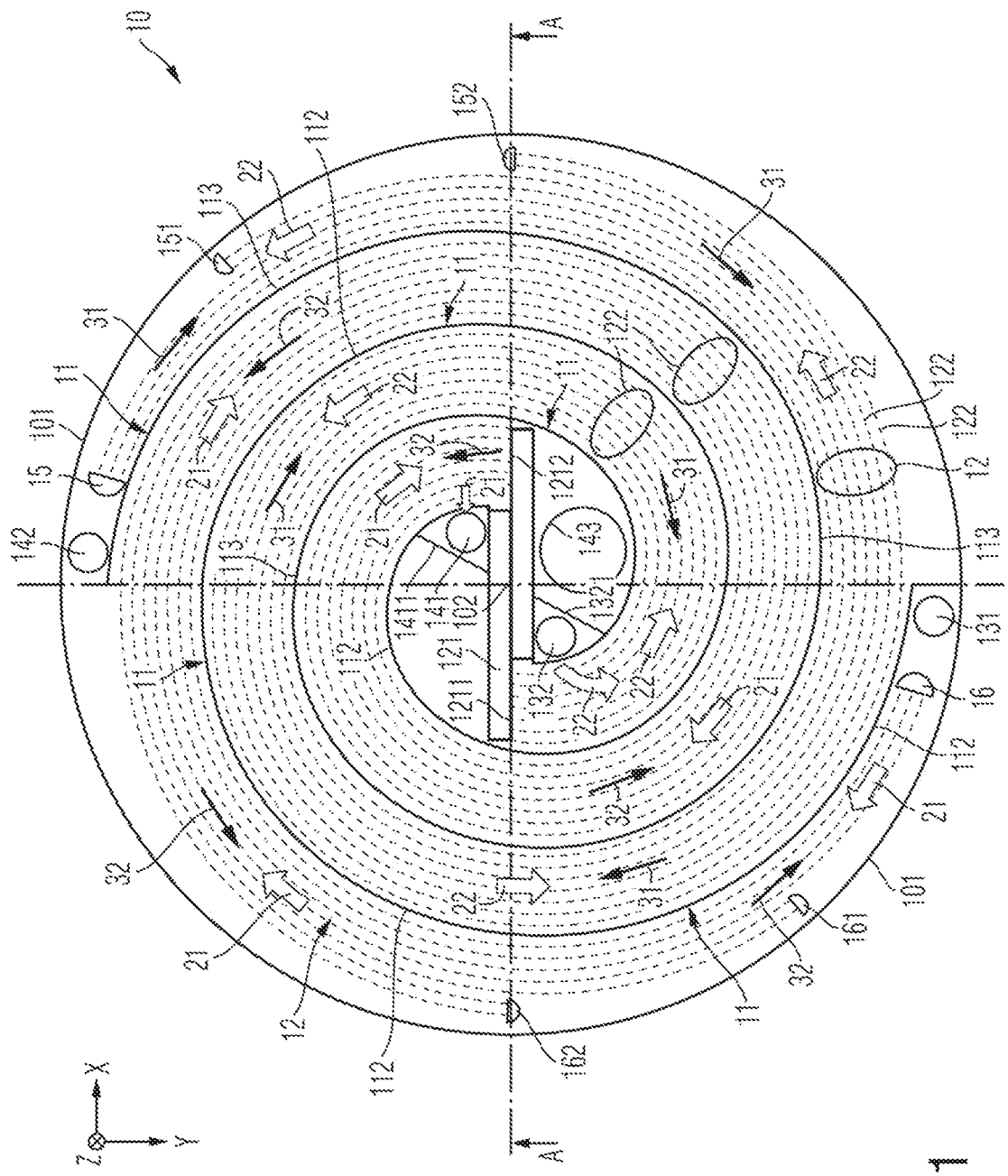
FIG. 1 is a schematic horizontal cross-sectional view of an example tray for a mass-transfer column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to trays for mass-transfer columns such as absorption columns, rectification columns, stripping columns, and/or distillation columns. In addition, the present disclosure generally relates to mass-transfer columns that comprise a plurality of such trays.

In one embodiment, the tray for the mass-transfer column comprises: a tray inlet via which the tray is supplied with the liquid phase; a tray outlet via which the liquid phase flows out from the tray; first guide means for guiding the liquid phase, where the first guide means form a first flow path along which the liquid phase flows from the tray inlet to the tray outlet; an inlet for a temperature-control fluid; an outlet for the temperature-control fluid; and second guide means for guiding the temperature-control fluid for heat exchange with the liquid phase, where the second guide means form a second flow path which overlaps with the first flow path and leads from the inlet to the outlet and the temperature-control fluid flows along the second flow path in a direction opposite to the flow direction of the liquid phase.

For example, the second flow path thus extends completely or virtually completely along the first flow path so that the temperature-control fluid flows in a direction opposite to the flow direction of the liquid phase in places where heat exchange between the liquid phase and the temperature-control fluid takes place. For this purpose, it can be advantageous for the inlet for the temperature-control fluid to be installed in the vicinity of the tray outlet and for the outlet for the temperature-control fluid to be installed in the vicinity of the tray inlet. For example, the flowing liquid phase thus "sees" a temperature-control fluid flowing toward it on its entire way from the tray inlet to the tray outlet. Improved energy exchange between the liquid phase and the temperature-control fluid can take place in this way.

In one embodiment, the tray for the mass-transfer column realizes a countercurrent principle in which the "tray-side" liquid phase and the temperature-control fluid guided by the second guide means, for example a "tube-side" temperature-control fluid, flow in opposite directions ("countercurrent") occurring over the entire or virtually entire tray.

Heat exchange can occur either by uptake of heat of the liquid phase by the temperature-control fluid or by release of heat by the temperature-control fluid. In the first case, cooling of the liquid phase thus takes place, and in the second case heating of the liquid phase takes place. Which case is employed depends on the respective process requirements.

In a further embodiment, the tray for the mass-transfer column comprises: a tray inlet via which the tray is supplied with the liquid phase; a tray outlet via which the liquid phase flows out from the tray; first guide means for guiding the liquid phase, where the first guide means form a first flow path along which the liquid phase flows from the tray inlet to the tray outlet, and: the tray inlet comprises a first entrance which is, for example, arranged at a periphery of the tray; the tray outlet comprises a first exit which is, for example, arranged in a center of the tray; and the first guide means comprise a spiral guide weir arrangement which in a spiral fashion forms the first flow path between the first entrance and the first exit.

The above-described embodiment having the spiral first flow path can achieve homogenization of the gas phase in the liquid phase, for example over the entire tray. For example, the guide weir arrangement receives the liquid phase flowing in via the tray inlet and guides this along the spiral first flow path to the tray outlet via which the liquid phase leaves the tray and is conveyed to a tray located underneath or is discharged from the mass-transfer column. The tray can, for example, have a circular area which is bounded by an outer wall. The spiral guide weir arrangement extends, for example like the outer wall, approximately perpendicularly to the tray, e.g. in the vertical direction, and can thus, for example together with the outer wall, form a fluid channel along the spiral first flow path for the liquid phase.

Further illustrative and optional features of further embodiments of the tray will be presented below. These features can be combined with one another to produce further embodiments, if they are not expressly described as alternative to one another. Here, the term "liquid" is also used instead of the term "liquid phase", with both terms having the same meaning. An analogous situation applies to the terms "gas phase" and "gas".

In particular, it may be pointed out that the two above-described embodiments can be combined with one another. In one embodiment of the tray, the countercurrent principle is thus realized and at the same time a spiral first flow path is provided.

In an embodiment which realizes the countercurrent principle, the tray inlet thus comprises, for example, a first entrance which can be arranged at a periphery of the tray. Furthermore, the tray outlet can comprise a first exit which can be arranged in a center of the tray, and the first guide means can comprise a spiral guide weir arrangement which in a spiral fashion forms the first flow path. For example, the guide weir arrangement receives the liquid phase flowing in via the tray inlet and guides this along the spiral first flow path to the tray outlet via which the liquid phase leaves the tray and is conveyed to a tray located underneath or is discharged from the mass-transfer column. The tray can, for example, have a circular area which is bounded by an outer wall. The spiral guide weir arrangement extends, for example like the outer wall, approximately perpendicularly to the tray, e.g. in the vertical direction, and can thus form, for example together with the outer wall, a fluid channel along the spiral first flow path for the liquid phase.

Furthermore, in a further development, it is possible for the tray inlet to comprise a second entrance which can be arranged in the center of the tray; and for the tray outlet to further comprise a second exit which can be arranged at the periphery of the tray; and for the spiral guide weir arrangement to form the first flow path with a spiral first transport path between the first entrance and the first exit and a spiral second transport path, between the second entrance and the second exit, running counter to the first transport path. The first transport path conveys the liquid phase from the first entrance to the first exit and the second transport path conveys the liquid phase from the second entrance to the second exit. In this further development, the tray inlet comprises, for example, at least two entrances, of which one is arranged at the center of the tray and the other is arranged at the tray periphery. In this further development, the tray outlet also comprises, for example, at least two exits, of which one is arranged at the center of the tray and the other is arranged at the tray periphery. If the tray is circular, the first entrance of the tray inlet arranged at the tray periphery can be offset by 180° relative to the second exit arranged at the tray periphery. The spiral guide weir arrangement can be configured for guiding the first transport path from the tray periphery in a spiral fashion to the center of the tray, and to guide the second transport path in a spiral fashion from the center of the tray to the tray periphery.

Furthermore, the spiral guide weir arrangement can be configured as a separation weir which separates the first transport path from the second transport path. The two transport paths can thus be conducted separately by the spiral guide weir arrangement. For example, the separation weir is always higher than the surface of liquid in the two transport paths.

The first transport path can lead from the first entrance to the first exit and in the process make a rotation by at least 360° in a first direction of rotation, for example clockwise. For example, the first transport path completes a rotation by 630°, i.e. about 1¾ revolutions, in a clockwise direction.

Similarly, the second transport path can lead from the second entrance to the second exit and in the process make a rotation by at least 360° in a direction of rotation opposite to the first direction of rotation. For example, the second transport path completes a rotation by 630°, i.e. about 1¾ revolutions, in a counterclockwise direction.

However, it goes without saying that the total number of degrees, for example the number of spirals, can be variable. In other embodiments, for example, there is only one spiral (rotation by 360°), or two spirals (rotation by 720°) or three spirals (rotation by 1080°) or a spiral arrangement which allows a rotation by a total number of degrees which is in the range from 360° to an integral multiple of 360°. This can apply both to the first transport path and to the second transport path.

The first transport path and the second transport path can have equal lengths. This can, for example, be ensured by appropriate positioning of the entrances of the tray inlet and the exits of the tray outlet and also by appropriate configuration of the guide weir arrangement.

In a further embodiment, the second guide means also give the second flow path a spiral shape. In this way, the temperature-control fluid can be conveyed in a spiral fashion along the tray. It can also be advantageous here for both the inlet for the temperature-control fluid and also the outlet for the temperature-control fluid to be provided at the periphery of the tray. For example, the inlet for the temperature-control fluid is positioned in the vicinity of the second exit of the tray outlet and the outlet for the temperature-control fluid is positioned in the vicinity of the first entrance of the tray inlet.

Furthermore, the second guide means for guiding the temperature-control fluid can have a deflection device arranged in the center of the tray, with the second guide means forming the second flow path having a spiral first subpath and a spiral second subpath running counter to the first subpath. This can, for example, be effected by the first subpath leading from the inlet to the deflection device and performing a rotation by at least 360° and the second subpath leading from the deflection device to the outlet and performing a rotation by at least 360° in the opposite direction. Here, the second subpath can overlap completely with the first transport path, and the first subpath can overlap completely with the second transport path.

Some embodiments also provide for both a spiral arrangement of the first guide means, for example the channels, for the liquid phase on the tray and also a spiral arrangement of the second guide means for the temperature-control fluid; owing to these two spirals arrangements, it is possible to realize a countercurrent principle according to which the temperature-control fluid flows in a direction opposite to the flow direction of the liquid phase on the tray, which can ensure improved energy exchange.

Furthermore, the spiral guide weir arrangement can be configured so that the separation of the two transport paths of the liquid phase results, for example, in the liquid phase flowing in the opposite direction at a dividing wall of the guide weir arrangement. This allows homogenization of the process, for example homogenized absorption of the gas in the liquid over the entire area of the tray.

The temperature-control fluid can be a gas, vapor or a liquid. For example, a fluid drive apparatus, for example a pump, which allows the gas or the vapor or the liquid to flow along the second flow path in a direction opposite to the flow direction of the fluid phase is provided.

The second guide means can comprise pipes, for example in the form of so-called tube coils, with a bending radius of the pipes along the total second course being able to be greater than a prescribed minimum value. The minimum value can be selected so that material-specific limits are not exceeded. In particular, the spiral arrangement of the pipes can allow a comparatively large bending radius.

In one embodiment, the minimum value of the bending radius is selected so as to be greater than a material-specific, critical, minimum bending radius. This comparatively large bending radius can, as indicated above, be determined by the spiral course. In comparison, in order to realize a meandering course, as is known, for example, from the abovementioned document WO 2013/072353 A1, small bending radii are necessary in order to implement the 180° turns in a tight space. The large bending radius places significantly lesser demand on the mechanical properties of the material of the pipes, so that the material of the pipes can be optimized in respect of other properties, for example in respect of corrosion resistance, rather than having to be selected with a view to a very small bending radius.

The pipes for conveying the temperature-control fluid can, as indicated above, extend along the entire or at least virtually along the entire first flow path, for example in such a way that the liquid phase comes into direct contact with the outer walls of the pipes. In other words, the pipes can extend parallel to the flow path of the liquid phase. Here, a plurality of pipes can be arranged next to one another, for example up to ten pipes or even more, and the pipes can also be provided in a plurality of layers, for example in two, three or more superposed layers.

The tray can be, for example, configured as sieve tray, valve tray, bubble cap tray or tunnel tray. The contact between the liquid phase and the gas phase can, for example, be ensured by a plurality of mass-transfer elements, with the mass-transfer elements being able to have gas passage openings (e.g. sieve holes), fixed valves, movable valves, bubble caps or tunnels provided in the tray.

A mass-transfer column comprising a plurality of superposed trays which are each configured according to one of the above-described embodiments is also proposed here. The mass-transfer column can be an absorption column, a rectification column, a stripping column or a distillation column.

For example, the mass-transfer column is an absorption column for preparing nitric acid.

Reference is now made to the accompanying drawings which form part of the description and in which the way in which the present disclosure can be implemented in practice is shown by way of various examples.

In this context, direction-indicating terminology such as "at the top", "at the bottom", "outside", "inside", etc., relating to the orientation of the figures which are being described can be used. Since parts of embodiments can be positioned in a number of different orientations, the direction-indicating terminology can be used for the purposes of illustration and in no way constitutes a restriction. It may be pointed out that other embodiments can be employed and it is possible to make structural or logical changes without going outside the scope of protection of the present invention. The following detailed description is therefore not to be interpreted in a restrictive sense, and the scope of protection of the present invention is defined by the accompanying claims.

Reference will now be made in detail to various embodiments and to one or more examples as shown in the figures. Each example will be presented in an explanatory way and does not indicate a restriction of the invention. For example, features shown or described as part of an embodiment can be applied to or in connection with other embodiments in order to create a further embodiment. It is intended that the present invention encompasses such modifications and variations. The examples are described using a specific language which is not to be interpreted as restricting the scope of protection of the accompanying claims. The drawings are not a true-to-scale representation and merely serve for the purposes of illustration. To aid understanding, the same elements have been, unless indicated otherwise, denoted by the same reference numerals in the various drawings.

Figure 2:
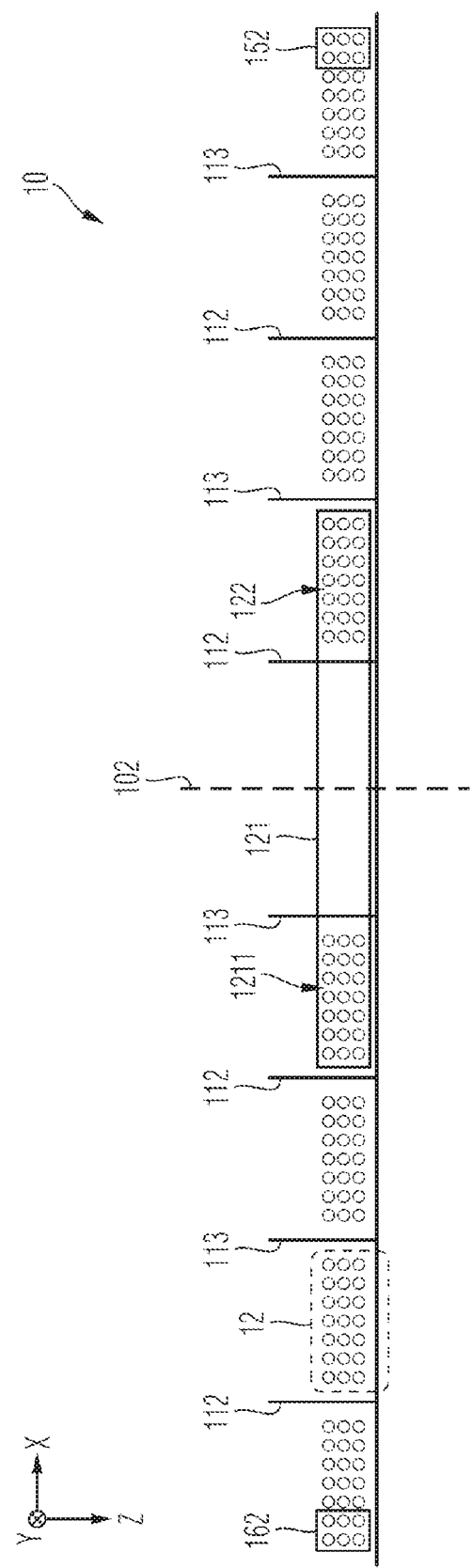
FIG. 2 is a schematic vertical cross-sectional view of an example tray for a mass-transfer column.

FIG. 1 shows, schematically and by way of example, a horizontal cross-sectional view in the XY plane of a section of a tray 10 for a mass-transfer column as per one or more embodiments, and FIG. 2 shows, schematically and by way of example, a vertical cross-sectional view in the XZ plane along the line A. Reference to both figures will be made below.

The tray 10 for a mass-transfer column (see reference numeral in FIG. 3 and FIG. 4) comprises a tray inlet 131, 132, via which the tray 10 is supplied with a liquid phase, and a tray outlet 141, 142, via which the liquid phase flows out from the tray 10. The tray 10 can have a circular shape and can also be bounded by a tray periphery 101 and have a tray center 102.

The tray inlet comprises, for example, a first entrance 131 arranged at the tray periphery 101 and a second entrance 132 arranged in the tray center 102. Via these two entrances, the tray 10 can, for example, receive the liquid phase from a tray located above it or from a main entrance for the liquid phase of the mass-transfer column.

Correspondingly, the tray outlet can, for example, have a first exit 141 provided in the tray center 102 and a second exit 142 provided at the tray periphery 101. The liquid flows out from the tray 10 via these two exits 141 and 142, for example to a tray located underneath it in the mass-transfer column or to a main exit of the mass transfer column. In addition, a manhole 143 which can, for example, be utilized by an inspector for the purposes of inspecting the tray 10 or the mass-transfer column can be provided in the tray center 102.

The tray 10 can be configured so as to allow contact between the liquid phase and the gas phase.

Furthermore, first guide means 11 for guiding the liquid phase are provided, with the first guide means 11 forming a first flow path 21, 22 along which the liquid phase flows from the tray inlet 131, 132 to the tray outlet 141, 142. During flow along the first flow path 21, 22, contact between the liquid phase and the gas phase can take place. The contact between the liquid phase and the gas phase can, for example, be ensured by means of mass-transfer elements such as gas passage openings (not shown) which can be distributed over the tray 10.

As shown schematically and by way of example in FIG. 1, the first guide means comprise a spiral guide weir arrangement 11 which forms the first flow path 21, 22 in a spiral fashion, namely with a spiral first transport path 21 and a spiral second transport path 22 running counter to the first transport path 21.

Here, the spiral guide weir arrangement 11 can be configured as a separation weir which separates the first transport path 21 from the second transport path 22. For example, the spiral guide weir arrangement 11 configured as a separation weir extends perpendicularly to the tray 10, always higher than the surface of the liquid in the two transport paths 21 and 22. The first transport path 21 leads from the first entrance 131 to the first exit 141, i.e. from the tray periphery 101 to the tray center 102, and in the process performs a rotation by at least 360° in a first direction of rotation, for example a rotation by about 630° in a clockwise direction. In an analogous way, the second transport path 22 leads from the second entrance 132 to the second exit 142, i.e. from the tray center 102 to the tray periphery 101, and in the process performs a rotation by at least 360° in a direction of rotation opposite to the direction of the first rotation, for example a rotation by about 630° in a counterclockwise direction.

For example, the spiral guide weir arrangement 11 comprises a first spiral separation weir 112 which leads in a spiral fashion from the first entrance 131 to the tray center 102 and also a spiral second separation weir 113 which is arranged offset relative to the first separation weir 112 and leads from the second exit 142 to the tray center 102. The liquid phase flows in a countercurrent manner both at the first separation weir 112 and also at a second separation weir 113. This allows homogenization of the process, for example homogenized absorption of the liquid over the area.

In the tray center 102, it is also possible to provide an outlet weir 1411 and also an inlet weir 1321 in order to ensure particular liquid levels in the first transport path 21 and the second transport path 22. Likewise, a further inlet weir (not shown here) can likewise be provided at the tray periphery 101 in the vicinity of the first entrance 131, and a further outlet weir (not shown here) can be provided in the vicinity of the second exit 142.

To implement this spiral flow of the liquid phase, it can be advantageous for, as shown in FIG. 1, the first entrance 131 of the tray inlet and also the second exit 142 of the tray outlet to be arranged offset by about 180° at the tray periphery 101.

The first transport path 21 and the second transport path 22 can have equal lengths, which allows homogeneous processing, for example homogeneous absorption of the gas in the liquid phase.

The first guide means 11 for guiding the liquid phase can additionally comprise an outer wall which, for example, has a cylindrical shape and extends perpendicularly to the tray 10 at the tray periphery 101. The outer wall can partly form and delimit in the radial direction the two outermost sections of the transport paths 21 and 22 together with the guide weir arrangement 11, as is shown in FIG. 1.

Differently from what the schematic depiction of FIG. 1 may indicate, the separation weirs 112 and 113 do not necessarily have to end at the first entrance 131 or at the second exit 142 but can instead continue their respective spiral course until they arrive, for instance, at the tray periphery 101. As a result, a dead space in which no liquid phase flows would then be formed in the radial direction between the section (not shown) of the first separation weir 112, which leads from the first entrance 131 to the tray periphery 101, and the tray periphery 101. A similar situation applies analogously to the second separation weir 113; there, a further dead space in which no liquid phase flows would be formed in the radial direction between the section (not shown) of the second separation weir 113, which leads from the second exit 142 to the tray periphery 101, and the tray periphery 101. These two dead spaces would occur in FIG. 1 where no pipes 122 are shown. In another embodiment, the separation weirs 112 and 113 end at the first entrance 131 or at the second exit 142 and the outer wall of the tray 10 delimits, in the radial direction, the outermost sections of the two transport paths 21 and 22, as is shown in FIG. 1.

In order to introduce or remove heat, a temperature-control fluid can be conveyed along the first flow path 21, 22, for example within one or more pipes, so as to effect heat exchange with the liquid phase.

For these purposes, the tray 10 comprises an inlet 15, 151, 152 for the temperature-control fluid and also an outlet 16, 161, 162 for the temperature-control fluid. Furthermore, second guide means 12 which form a second flow path 31, 32 which overlaps with the first flow path 21, 22 and leads from the inlet 15, 151, 152 to the outlet 16, 161, 162 are provided, with the temperature-control fluid flowing along the second flow path 31, 32 in a direction opposite to the flow direction of the liquid phase, as is indicated in FIG. 1 by the direction-indicating arrows.

The temperature-control fluid can be a gas, vapor or a liquid. For example, a fluid drive apparatus (not shown), for example a pump, which allows the gas or the vapor or the liquid to flow along the second flow path in a direction opposite to the flow direction of the fluid phase is provided.

The second guide means 12 can comprise pipes 122 through which the temperature-control fluid is conveyed, about which more will be said below.

The second guide means 12 can also form the second flow path 31, 32 in a spiral fashion, namely corresponding to the first flow path 21, 22. For this purpose, it can be advantageous for both the inlet 15, 151, 152 for the temperature-control fluid and also the outlet 16, 161, 162 for the temperature-control fluid to be arranged at the periphery 101 of the tray 10. The second guide means advantageously further comprise a deflection device 121 arranged in the center 102 of the tray 10. In this way, the second guide means 12 can form the second flow path with a spiral first subpath 31 and a spiral second subpath 32 running in a direction opposite to the first subpath 31. For example, the first subpath 31 leads from the inlet 15, 151, 152 to the deflection device 121 and performs a rotation by at least 360°, and the second subpath 32 leads from the deflection device 121 to the outlet 16, 161, 162 and performs a rotation by at least 360° in the opposite direction. In a manner corresponding to the first flow path 21 for the liquid phase, the second subpath 32 for the temperature-control fluid can perform a rotation by about 630° in a counterclockwise direction, and the first subpath 31 for the temperature-control fluid can, in a manner corresponding to the second flow path 22 for the liquid phase, perform a rotation by about 630° in a clockwise direction.

A bending radius of the pipes 122 along the entire second course 31, 32 is, for example, always greater than a prescribed minimum value. In one embodiment, the minimum value of the bending radius is selected so as to be greater than a material-specific, critical, minimum bending radius. This comparatively large bending radius can, as has been mentioned above, be determined by the spiral course. On the other hand, in order to realize a meandering course as is known, for example, from the abovementioned document WO 2013/072353 A1, small bending radii are necessary in order to implement the 180° turns in a tight space. The large bending radius places significantly lesser demand on the mechanical properties of the material of the pipes 122, so that the material of the pipes 122 can be optimized in respect of other properties, for example in respect of the corrosion resistance, rather than having to be selected with a view to a very small bending radius.

A transition between the first subpath 31 and the second subpath 32 can be effected by means of the deflection device 121 in the tray center 102. For this purpose, the deflection device 121 has, for example, an entry interface 1211 into which the pipes 122 which form the first subpath 31 open, and also an exit interface 1212 from which the pipes 122 which form the second subpath 32 exit.

The second subpath 32 can overlap completely or at least virtually completely with the first transport path 21 and the first subpath 31 can overlap completely or at least virtually completely with the second transport path 22.

For example, the liquid phase flowing along the paths 21 and 22 thus "sees" a temperature-control fluid flowing toward it on its entire way from the tray inlet 131 or 132 to the tray outlet 141 or 142. In this way, improved energy exchange (i.e. heat exchange) between the liquid phase and the temperature-control fluid can take place.

The heat exchange can take place either by transfer of heat from the liquid phase to the temperature-control fluid or by transfer of heat from the temperature-control fluid to the liquid phase. In the first case, cooling of the liquid phase thus takes place, and in the second case heating of the liquid phase takes place. Which case is employed, depends on the process requirements.

The pipes 122 for conveying the temperature-control fluid can, as indicated above, extend along the entire or at least virtually along the entire first flow path 21, 22, for example in such a way that the liquid phase comes into direct contact with the outer walls of the pipes 122. In other words, the pipes can extend parallel to the flow path of the liquid phase. Here, a plurality of pipes 122 can be arranged next to one another, for example seven pipes 122, and the pipes 122 can also be provided in a plurality of layers, for example in three superposed layers, as is shown in FIG. 2.

Since the width of the two transport paths 21 and 22 in the respective outermost sections can be tapered due to firstly the circular outer wall at the tray periphery 101 and secondly the spiral guide weir arrangement 11, it can be advantageous for the inlet for the temperature-control fluid as well as the outlet for the temperature-control fluid to be distributed at the tray periphery 101. For example, a main inlet 15 in the vicinity of the second exit 142 of the tray outlet, from which inlet three inner pipes 122 can exit, and also two secondary inlets 151 and 152 offset by 45° and 90°, respectively, thereto, from which in each case two further outer pipes 122 can exit, are provided. A corresponding situation applies at the end of the second subpath 32 where firstly two secondary outlets 161 and 162, offset by 45° in relation to one another, into which in each case two outer pipes 122 can open and also, again offset by 45°, a main outlet 16 in the vicinity of the first entrance 131 of the tray inlet, into which outlet the four further inner pipes 122 open, can be provided. Depending on the number of layers of pipes 122 provided, the above figures in respect of the number of pipes which exit from the inlets 15, 151, 152 or open into the outlets 16, 161, 162 have to be multiplied correspondingly. In the example corresponding to FIG. 2, where three layers are provided, nine inner pipes 122, for example, exit from the main inlet 15 and in each case six outer pipes exit from the secondary inlets 151 and 152, and corresponding numbers of pipes 122 open into the outlets 16, 161, 162.

In one embodiment, the inlets 15, 151 and 152 can be connected via one or more collection conduits (not shown), and the same applies to the outlets 16, 161 and 162. Looking at FIG. 2, it is possible, for example, for 2×3 pipes 122 to go out at the inlet 152. A collection conduit then leads from the inlet 152 to the inlet 151 where further 2×3 pipes 122 exit. From there, a collection conduit leads again to the main inlet 15, and the first 3×3 pipes 122 go out from there.

Figure 3:
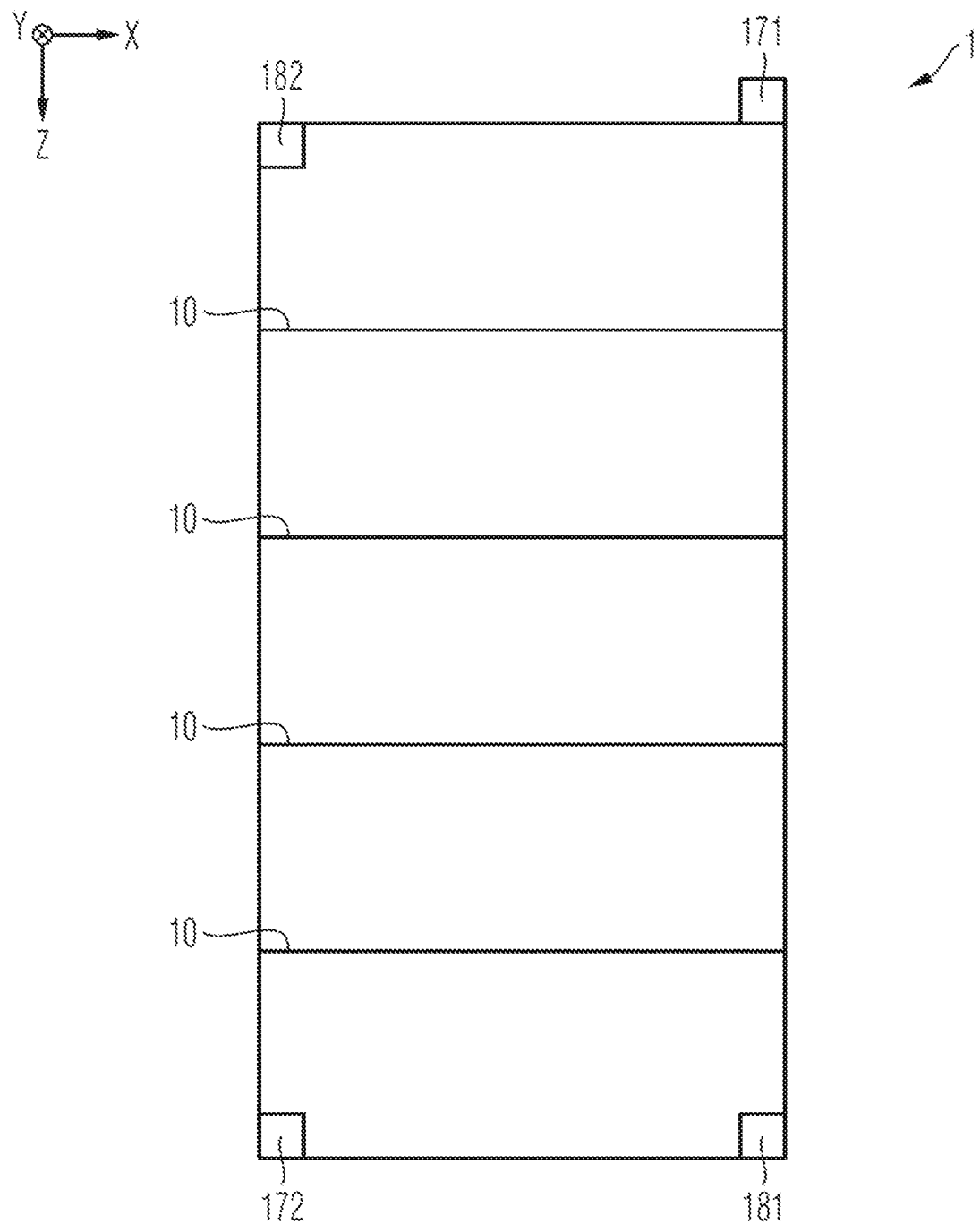
FIG. 3 is a schematic vertical cross-sectional view of an example mass-transfer column.
Figure 4:
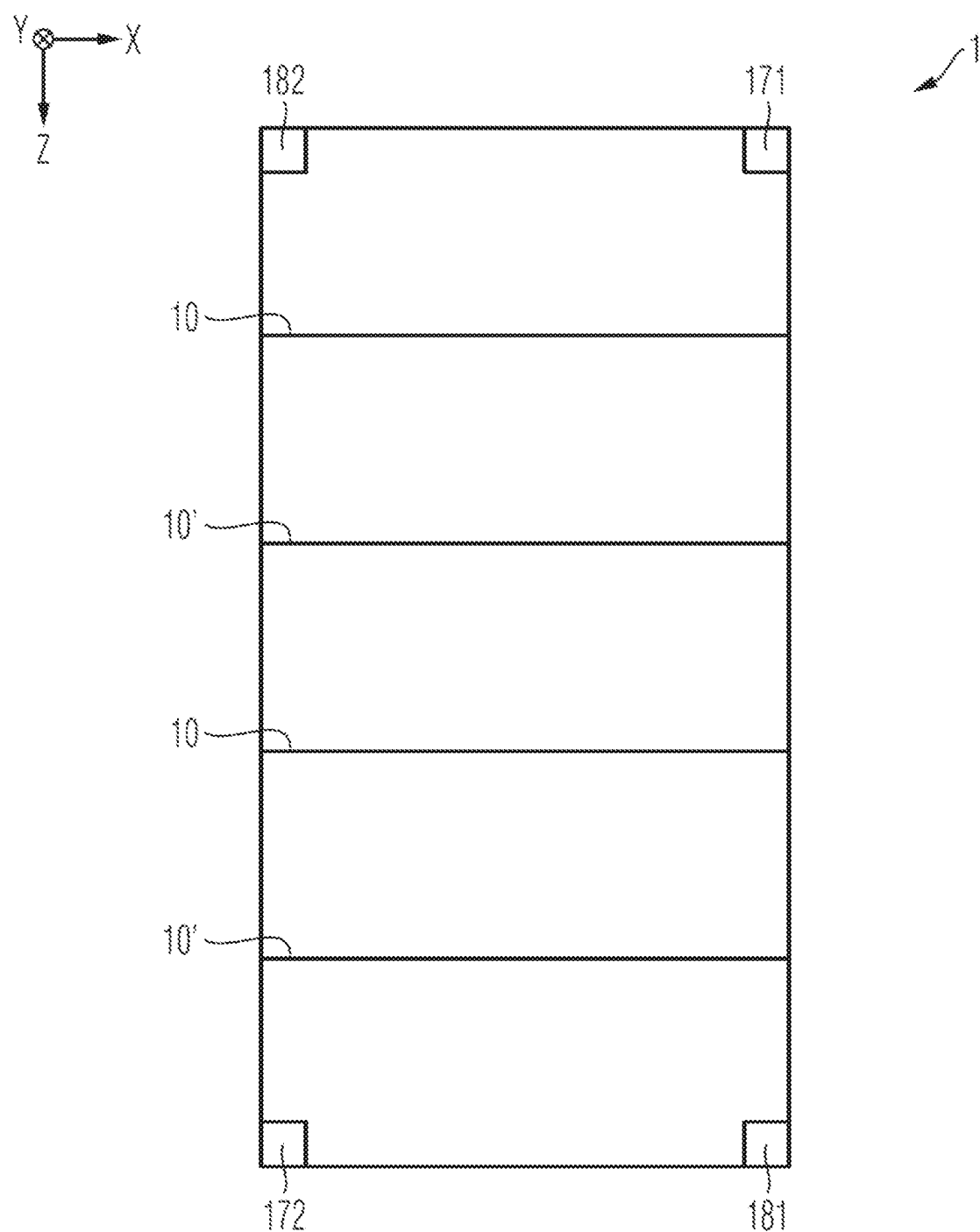
FIG. 4 is a schematic vertical cross-sectional view of another example mass-transfer column.

FIGS. 3 and 4 each show, schematically and by way of example, a vertical cross section of a section of a mass-transfer column 1 as per one or more embodiments.

The mass-transfer column 1 comprises a plurality of superposed trays 10 or 10', which can in each case be configured according to one of the above-described embodiments. The mass-transfer column 1 can be an absorption column, a rectification column, a stripping column or a distillation column.

For example, the mass-transfer column 1 is an absorption column for preparing nitric acid.

The liquid phase is fed into the mass-transfer column 1 via, for example, a main entrance 171 and discharged via a main exit 172. The gas phase can be fed into the mass-transfer column 1 via a central gas entrance 181 and discharged via a central gas exit 182. The liquid phase is thus conveyed in the vertical direction Z in the mass-transfer column 1, and the gas phase is conveyed counter to the vertical direction Z, as has been indicated above. In order to ensure contact between the liquid phase and the gas phase, each of the trays 10 and 10' can comprise said mass-transfer elements, for example gas passage openings.

As has been said, the trays 10 or 10' are arranged above one another in the mass-transfer column 1. This in principle means that the tray outlet (see reference numerals 131 and 132 in FIG. 1) of the respective upper tray 10 or 10' is to be connected to the tray inlet (see reference numerals 141 and 142 in FIG. 1) of the tray 10 or 10' located underneath. This task can, for example, be performed by the abovementioned downcomer or downcomers (not shown here), which is known in principle to those skilled in the art.

In the variant shown in FIG. 4, the trays 10 and 10' have in each case been rotated by 180° relative to one another, so that the design of the downcomers between the respective trays can be made essentially identical.

In the variant shown in FIG. 3, all trays 10 are configured in essentially the same way, but this can mean that the configuration of the downcomers between the respective trays 10 has to change alternately.

In a further variant still, only every second tray 10 of the mass-transfer column 1 realizes the above-described countercurrent principle. In this way, the need to change the downcomers alternately can be avoided.

The terms "comprising", "having", "including" and similar open terms as used here, which indicate the presence of stated elements or features, do not, however, rule out additional elements or features. In view of the above range of variations and uses, it may be pointed out that the present invention is not restricted by the above description, and is also not restricted by the accompanying drawings. Rather, the present invention is restricted only by the following claims and the legal equivalents thereof.

What is claimed is:

1. A tray for a mass-transfer column, wherein the tray is configured to permit contact between a liquid phase and a gas phase, the tray comprising:
   a tray inlet via which the tray is supplied with the liquid phase, the tray inlet comprising a first entrance;
   a tray outlet via which the liquid phase runs out of the tray, the tray outlet comprising a first exit;
   first guide means for guiding the liquid phase, wherein the first guide means forms a first flow path along which the liquid phase flows from the tray inlet to the tray outlet, wherein the first guide means comprises a spiral guide weir arrangement that in a spiral manner forms the first flow path between the first entrance and the first exit;
   an inlet for a temperature-control fluid;
   an outlet for the temperature-control fluid; and
   second guide means for guiding the temperature-control fluid for heat exchange with the liquid phase, wherein the second guide means forms a second flow path that overlaps with the first flow path and leads from the inlet to the outlet and the temperature-control fluid flows along the second flow path in a direction opposite to a flow direction of the liquid phase.

2. The tray of claim 1 wherein both the inlet for the temperature-control fluid and the outlet for the temperature-control fluid are disposed at a periphery of the tray.

3. The tray of claim 2 wherein the second guide means forms the second flow path in a spiral manner, wherein the second guide means comprises a deflection device that is disposed in a center of the tray, wherein the second guide means forms the second flow path with a first spiral subpath and a second spiral subpath that runs counter to the first spiral subpath.

4. The tray of claim 3 wherein the first spiral subpath leads from the inlet to the deflection device and rotates at least 360°, wherein the second spiral subpath leads from the deflection device to the outlet and rotates at least 360° opposite the rotation of the first spiral subpath.

5. The tray of claim 4 wherein the tray inlet comprises a second entrance, wherein the tray outlet comprises a second exit, wherein the spiral guide weir arrangement forms the first flow path with a first spiral transport path between the first entrance and the first exit and a second spiral transport path, which runs counter to the first spiral transport path, between the second entrance and the second exit, wherein the first spiral transport path leads from the first entrance to the first exit and rotates at least 360° in a first direction of rotation, wherein the second spiral transport path leads from the second entrance to the second exit and rotates at least 360° in a direction of rotation opposite to the first direction of rotation, wherein the second spiral subpath completely overlaps with the first spiral transport path, wherein the first spiral subpath completely overlaps with the second spiral transport path.

6. A tray for a mass-transfer column, wherein the tray is configured to permit contact between a liquid phase and a gas phase, the tray comprising:
   a tray inlet via which the tray is supplied with the liquid phase, the tray inlet comprising a first entrance;
   a tray outlet via which the liquid phase flows out of the tray, the tray outlet comprising a first exit;
   first guide means for guiding the liquid phase, wherein the first guide means forms a first flow path along which the liquid phase flows from the tray inlet to the tray outlet, wherein the first guide means comprises a spiral guide weir arrangement that in a spiral manner forms the first flow path between the first entrance and the first exit; and
   a second guide means for guiding a temperature-control fluid for heat exchange with the liquid phase, wherein the second guide means forms a second flow path that overlaps with the first flow path and leads from an inlet to an outlet and the temperature-control fluid flows along the second flow path in a direction opposite to a flow direction of the liquid phase.

7. The tray of claim 6 wherein the tray inlet comprises a second entrance, wherein the tray outlet comprises a second exit, wherein the spiral guide weir arrangement forms the first flow path with a first spiral transport path between the first entrance and the first exit and a second spiral transport path, which runs counter to the first spiral transport path, between the second entrance and the second exit.

8. The tray of claim 7 wherein the spiral guide weir arrangement is configured as a separation weir that separates the first spiral transport path from the second spiral transport path.

9. The tray of claim 7 wherein the first spiral transport path leads from the first entrance to the first exit and rotates at least 360° in a first direction of rotation.

10. The tray of claim 9 wherein the second spiral transport path leads from the second entrance to the second exit and rotates at least 360° in a direction of rotation opposite to the first direction of rotation.

11. The tray of claim 7 wherein a length of the first spiral transport path is equal to a length of the second spiral transport path.

12. The tray of claim 6 wherein the second guide means forms the second flow path in a spiral manner.

13. A mass-transfer column comprising a plurality of superposed trays that are each configured as the tray of claim 6.

* * * * *